(12) United States Patent
Cook

(10) Patent No.: US 10,948,370 B2
(45) Date of Patent: Mar. 16, 2021

(54) HAPTIC PIN FIELD SENSOR AND MANIPULATOR

(71) Applicant: The Boeing Company, Chicago, IL (US)

(72) Inventor: Rebecca Cook, North Charleston, SC (US)

(73) Assignee: The Boeing Company, Chicago, IL (US)

(*) Notice: Subject to any disclaimer, the term of this patent is extended or adjusted under 35 U.S.C. 154(b) by 31 days.

(21) Appl. No.: 16/207,955

(22) Filed: Dec. 3, 2018

(65) Prior Publication Data

US 2019/0310152 A1 Oct. 10, 2019

Related U.S. Application Data

(60) Provisional application No. 62/655,584, filed on Apr. 10, 2018.

(51) Int. Cl.
| | | |
|---|---|---|
| *G01L 5/22* | (2006.01) | |
| *B25J 15/00* | (2006.01) | |
| *G01L 5/00* | (2006.01) | |
| *G06F 3/01* | (2006.01) | |
| *B25J 9/00* | (2006.01) | |
| *B25J 15/10* | (2006.01) | |
| *G09B 21/00* | (2006.01) | |

(52) U.S. Cl.
CPC ............ *G01L 5/226* (2013.01); *B25J 9/0084* (2013.01); *B25J 15/009* (2013.01); *B25J 15/106* (2013.01); *G01L 5/0061* (2013.01); *G06F 3/016* (2013.01); *G09B 21/00* (2013.01); *G09B 21/004* (2013.01)

(58) Field of Classification Search
CPC ...... G01L 5/226; G01L 5/0061; B25J 9/0084; B25J 15/009; B25J 15/106; G06F 3/016; G09B 21/00; G09B 21/004; A61B 17/3421; A61B 17/29
USPC ..................... 73/862.041–862.046
See application file for complete search history.

(56) References Cited

U.S. PATENT DOCUMENTS

| | | | |
|---|---|---|---|
| 4,896,914 A | 1/1990 | Stevens | |
| 6,536,292 B1 * | 3/2003 | Richards | G01L 1/205 73/862.041 |
| 7,386,412 B2 * | 6/2008 | Luchini | G01K 1/026 374/E1.005 |
| 8,534,728 B1 | 9/2013 | Bosscher et al. | |
| 9,142,105 B1 * | 9/2015 | Crofford | G06F 3/016 |
| 9,836,930 B2 * | 12/2017 | De Luca | G06F 3/016 |
| 2009/0314112 A1 | 12/2009 | Melvill et al. | |

(Continued)

FOREIGN PATENT DOCUMENTS

| | | | | |
|---|---|---|---|---|
| EP | 3081831 A1 * | 10/2016 | ............. | F16H 57/01 |
| GB | 2148239 A | 5/1985 | | |

OTHER PUBLICATIONS

European Patent Office Extended Search Report, dated Aug. 12, 2019, regarding Application No. 19168094.1, 11 pages.

*Primary Examiner* — Octavia Hollington
(74) *Attorney, Agent, or Firm* — Yee & Associates, P.C.

(57) ABSTRACT

A pin field, comprising a plurality of pins mounted parallel with each other in a frame. The plurality of pins are extendable and retractable from the frame for sensing an object or for manipulation of the object in a working environment wherein a distal end of each pin in the plurality of pins comprises a combination pressure and temperature sensor.

22 Claims, 14 Drawing Sheets

(56) References Cited

U.S. PATENT DOCUMENTS

| | | | |
|---|---|---|---|
| 2012/0307590 A1* | 12/2012 | Faruque | A61B 5/6843 367/7 |
| 2014/0170870 A1 | 6/2014 | Martineau | |
| 2016/0229557 A1 | 8/2016 | McChesney | |
| 2016/0299602 A1 | 10/2016 | Shuster et al. | |
| 2017/0193766 A1 | 7/2017 | De Luca et al. | |

* cited by examiner

HAPTIC PIN FIELD SENSOR AND MANIPULATOR

CROSS-REFERENCE TO RELATED APPLICATION

This application claims the benefit of U.S. Provisional Patent Application No. 62/655,584, filed Apr. 10, 2018, which is incorporated by reference herein.

BACKGROUND INFORMATION

1. Field

The present disclosure relates generally to systems and methods for sensing and manipulating objects. More particularly, the present disclosure relates to a method and apparatus for sensing and manipulating objects using a haptic pin field.

2. Background

The need for effective telerobotic sensing and object manipulation comes from a cross-industry need to be able to sense and manipulate an object or environment in an area in which it is impossible, difficult, or unsafe for a human to access or perform work.

Haptic technology recreates the sense of touch by applying forces, vibrations, or motions to the user. This mechanical stimulation can be used to assist in the creation of virtual objects in a computer simulation, to control such virtual objects, and to enhance the remote control of machines and devices. Haptic devices may incorporate tactile sensors that measure forces exerted by the user on the interface.

Current haptic technology attempts to recreate human senses through technology. For example, existing haptic and telerobotic solutions attempt to relay touch sense information through telerobotics to a human. For example, a glove or other device that interfaces with the human hand may be used to relay the information. The glove or other device may be equipped with electronic systems that attempt to recreate sensations from the environment where the sensing device is telerobotically located. For example, a rough surface might feed a relay of vibration to communicate the "bumpy" feeling of this type of surface. In another example, a small jointed-arm stylus may restrict motion when coming in contact with a static object to communicate boundaries of the object.

Both of these methods communicate some haptic information, but they are very limited in the fidelity of the sensing information they can communicate. They also require a high level of interpretation of the information they provide for it to become at all meaningful in a sensing aspect. With the jointed arm, a person must attempt to visualize and remember where resistance was and was not received, to develop a mental configuration of the object or environment being sensed. Likewise, with the glove giving information through means such as vibration, the human wearing the glove must interpret what structures different levels of vibration correlate with.

Traditional claw style end effectors may be used to grasp and manipulate objects in various environments. However, traditional claw style end effectors may not work well universally for objects having various different and irregular shapes or other characteristics.

A need exists for a method and apparatus that take into account at least some of the issues discussed above, as well as other possible issues.

SUMMARY

Illustrative embodiments provide a pin field, comprising a plurality of pins mounted parallel with each other in a frame. The plurality of pins are extendable and retractable from the frame for sensing an object or for manipulation of an object in a working environment.

Illustrative embodiments also provide a pin field sensing system, comprising a first pin field and a sensing pin field. The first pin field comprises a first plurality of pins mounted parallel with each other in a frame, wherein each pin in the first plurality of pins is independently extendable and retractable from the frame to sense an object. The sensing pin field comprises a plurality of parallel actuator driven pins, wherein pins in the sensing pin field are controlled to replicate the surface of an object against which the first plurality of pins is placed.

Illustrative embodiments also provide a method of sensing or manipulating an object in a work environment. A plurality of pins in a pin field are placed against the object. The pin field comprises a plurality of pins mounted parallel with each other in a frame, wherein each pin in the plurality of pins is independently extendable and retractable from the frame. Sensor information is received from the plurality of pins placed against the object to sense the object or the plurality of pins placed against the object are controlled to manipulate the object in a working environment.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
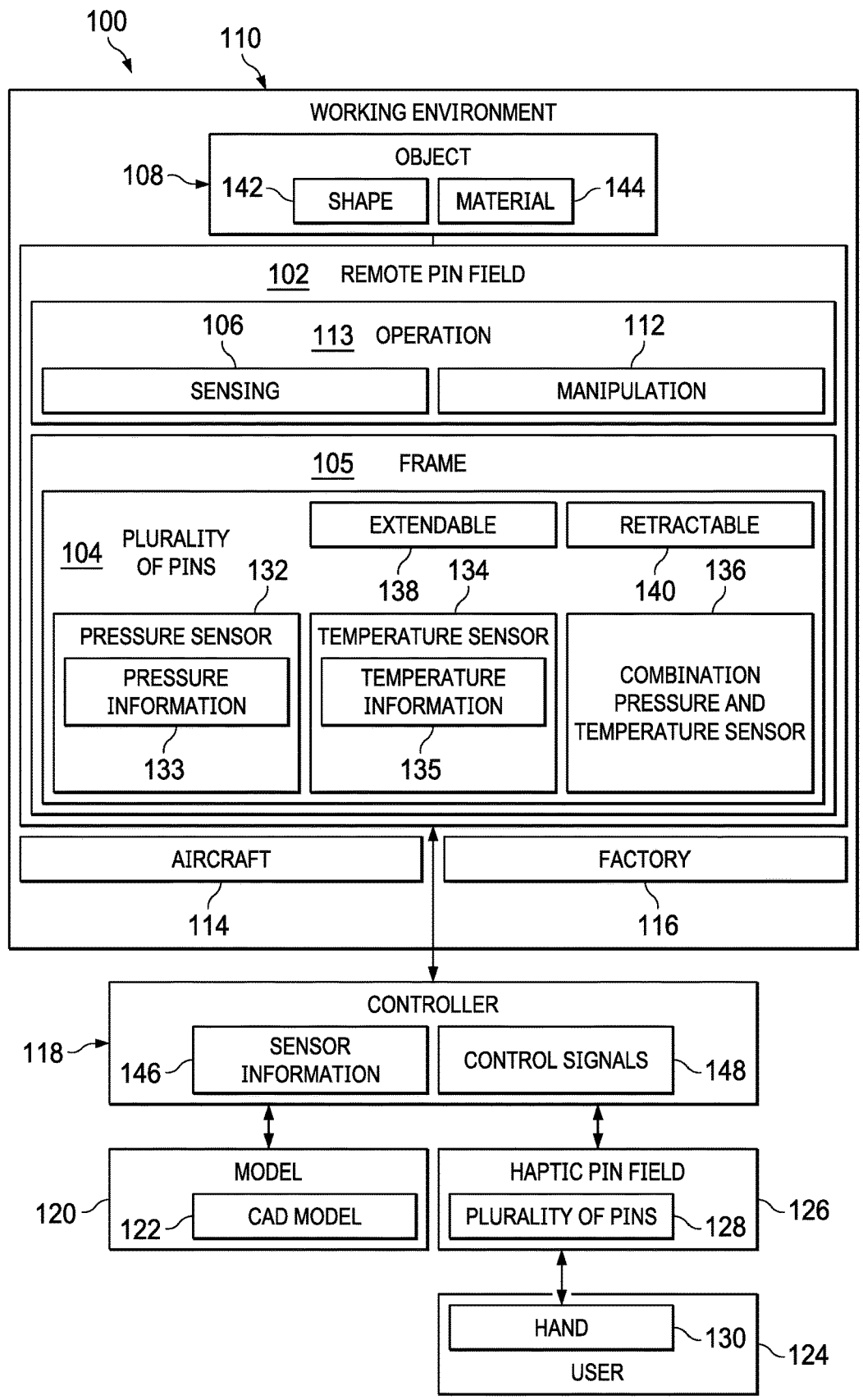
FIG. 1 is an illustration of a block diagram of a haptic pin field sensing and manipulation system in accordance with an illustrative embodiment.

The illustrative embodiments recognize and take into account different considerations. For example, the illustrative embodiments recognize and take into account that current haptic solutions for telerobotics may lack effectiveness. For example, current haptic solutions may not provide a useful haptic representation of an object being sensed.

Illustrative embodiments provide a haptic, sensing, actuated pin field that may be used as an end effector in telerobotic applications. An end effector in accordance with an illustrative embodiment approaches haptic feedback in an entirely new way by recreating the environment for a human operator to sense through telerobotics as opposed to attempting to recreate and relay human senses through technology. Recreating the environment to be sensed and allowing a human to use natural senses to interpret may achieve maximum effectiveness for various applications in a hazardous environment, while keeping the human operator safe.

In accordance with an illustrative embodiment, each of the pins in a pin field is equipped with a combination pressure and temperature sensor on its head. These sensors allow the pins in the pin field to relay data regarding changes in temperature and weight. Pressure or force data obtained from the pins as the pin field is moved against an object may be analyzed to make material type determinations. Additionally, detecting temperature at each pin head data point can also provide data to be analyzed to make material type determinations.

Illustrative embodiments also provide a method and apparatus for grasping a wide variety of objects that provides an improvement over claw style and other traditional end effectors and manipulators that may not work well universally. Rather than seeking to find the perfect size or shape end effector design for grasping, illustrative embodiments allow a pin field to make contact with an object of any geometry, engaging with all its protrusions and intrusions for a firm, universal hold when the actuators are locked in place upon engagement.

A data processing system may use sensed information such as the pin position, force information, temperature changes, and/or object shape to identify an object's material composition (e.g., plastic, metal, wood, etc.). The system may also use the information to identify a shape of the object. The system controller may generate a three-dimensional model, such as a computer aided design (CAD) model, of the object from the sensed shape of the object. For example, a pin field end effector in accordance with an illustrative embodiment may grasp and release the object from varying orientations to obtain a three-dimensional profile of the shape of the object.

The pins in the pin field then may be manipulated from the CAD model of the object or from a control station physical pin field to move the pins in the end effector pin field to manipulate the object. For example, the model of the object may be used to set the pins to an appropriate shape to engage a portion of the object to be manipulated. This allows a human operator to interface with and manipulate an object telerobotically. Tasks can be completed with this feature, such as moving and separating wires, installing or removing hardware such as a nut, or picking up an object while making contact with only certain features.

Turning to FIG. 1, an illustration of a block diagram of a haptic pin field sensing and manipulation system is depicted in accordance with an illustrative embodiment. Haptic pin field sensing and manipulation system 100 includes remote pin field 102. Remote pin field 102 includes plurality of pins 104. Plurality of pins 104 may be mounted substantially parallel with each other in frame 105 and may be independently extendable 138 and retractable 140 from frame 105.

Plurality of pins 104 may be configured to perform operation 113 on object 108 in working environment 110. For example, plurality of pins 104 may be configured for sensing 106 object 108 in working environment 110. Alternatively, or in addition, plurality of pins 104 in remote pin field 102 may be configured to be controlled for manipulation 112 of object 108 in working environment 110. Sensing 106 and manipulation 112 are examples, without limitation, of operation 113 that may be performed in working environment 110.

Remote pin field 102 may be configured for sensing 106 various different characteristics of object 108. For example, without limitation, remote pin field 110 may be configured for sensing shape 142 of object 108, material 144 from which object 108 is made, or any other appropriate characteristic or combination of characteristics of object 108.

For example, without limitation, pins in plurality of pins 104 may include pressure sensor 132, temperature sensor 134, combination pressure and temperature sensor 136, or any other appropriate sensor or combination of sensors for sensing 106 object 108. Pressure sensor 132 may provide pressure information 133. Temperature sensor 134 may provide temperature information 135. Combined pressure and temperature sensor 136 may provide both pressure information 133 and temperature information 135. In accordance with an illustrative embodiment, pressure sensor 132 may include a force sensor and pressure information 133 may include force information.

Working environment 110 may be any appropriate environment in which it may be desirable to sense object 108 or to manipulate object 108 in any appropriate manner. Working environment 110 may be an environment in which it is impossible, difficult, or otherwise undesirable for a human to perform sensing or manipulation of object 108. For example, without limitation, working environment 110 may be an area in which it may be hazardous for a human to work or which may be inaccessible to a human. For example, without limitation, working environment 110 may be a confined space on an aircraft 114 or other vehicle or other structure, or a factory 116 or other facility at which a manufacturing, inspection, or other process may be performed using remote pin field 102. Object 108 may be any appropriate object in working environment 110.

For example, without limitation, working environment 110 may be a factory 116 or other manufacturing or assembly facility in which aircraft 114 is being made. For example, without limitation, object 108 may be a wire in a location that is difficult for a human to reach, such as inside of a wing box of aircraft 114. In this example, remote pin field 102 may be used for sensing 106 of the wire to determine, for example, whether the wire is hot.

A robotic manipulator or other appropriate system or device may be used to move remote pin field 102 into contact with object 108 to perform sensing 106 or manipulation 112 of object 108. Sensing 106 of object 108 may be performed using appropriate sensors, such as pressure and temperature sensors, in plurality of pins 104. Manipulation 112 of object 108 may include moving plurality of pins 104 into a desired configuration for interaction with object 108.

Controller 118 may be configured to control the robotic manipulator or other system or device for moving remote pin field 102 into contact with object 108 and to move the robotic manipulator or other system or device to move remote pin field 102 when remote pin field 102 is in contact with object 108 to perform desired manipulation 112 of object 108. Controller 118 also may be configured to control movement of plurality of pins 104 to configure plurality of pins 104 into a desired shape for manipulation of object 108. Controller 118 may be configured to generate control signals 148 to control operation of remote pin field 102. For example, without limitation, control signals 148 may be provided by controller 118 to control the extending and retracting of pins in plurality of pins 104.

Controller 118 also may be configured to process sensor information 146 from sensing 106 of object 108 by remote pin field 102 to determine and display various characteristics of object 108. Pressure information 133 and temperature information 135 are examples, without limitation, of sensor information 146.

Controller 118 may be implemented in hardware or in hardware in combination with software. For example, without limitation, controller 118 may be implemented using a computer or other data processing system.

Controller 118 may use information from sensing 106 of object 108 to create or modify model 120 of object 108. For example, model 120 of object 108 may be computer aided design, CAD, model 122. Model 120 of object 108 may be used by controller 118 to control the positioning of remote pin field with respect to object 108 or to control the configuration of plurality of pins 104 in remote pin field 102 for manipulation 112 of object 108.

The shape of object 108 as determined using remote pin field 102 may be presented to user 124 by haptic pin field 126. Haptic pin field 126 includes plurality of pins 128. Controller 118 may control plurality of pins 128 in haptic pin field 126 to represent the shape of object 108 as determined by remote pin field 102. User 124 thus may feel the shape of object 108 in working environment 110 by feeling plurality of pins 128 in haptic pin field 126 by hand 130.

Alternatively, or in addition, haptic pin field 126 may be used to control plurality of pins 104 in remote pin field 102. User 124 may move plurality of pins 128 in haptic pin field 126 by hand 130. The configuration of plurality of pins 128 in haptic pin field 126, as controlled by user 124, may be detected and used by controller 118 to control plurality of pins 104 in remote pin field 102 to match the configuration of plurality of pins 128 in haptic pin field 126. Thus, for example, user 124 may perform manipulation 112 of object 108 in working environment 110 using remote pin field 102 by manipulating plurality of pins 128 in haptic pin field 126.

The illustration of haptic pin field sensing and manipulation system 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 2:
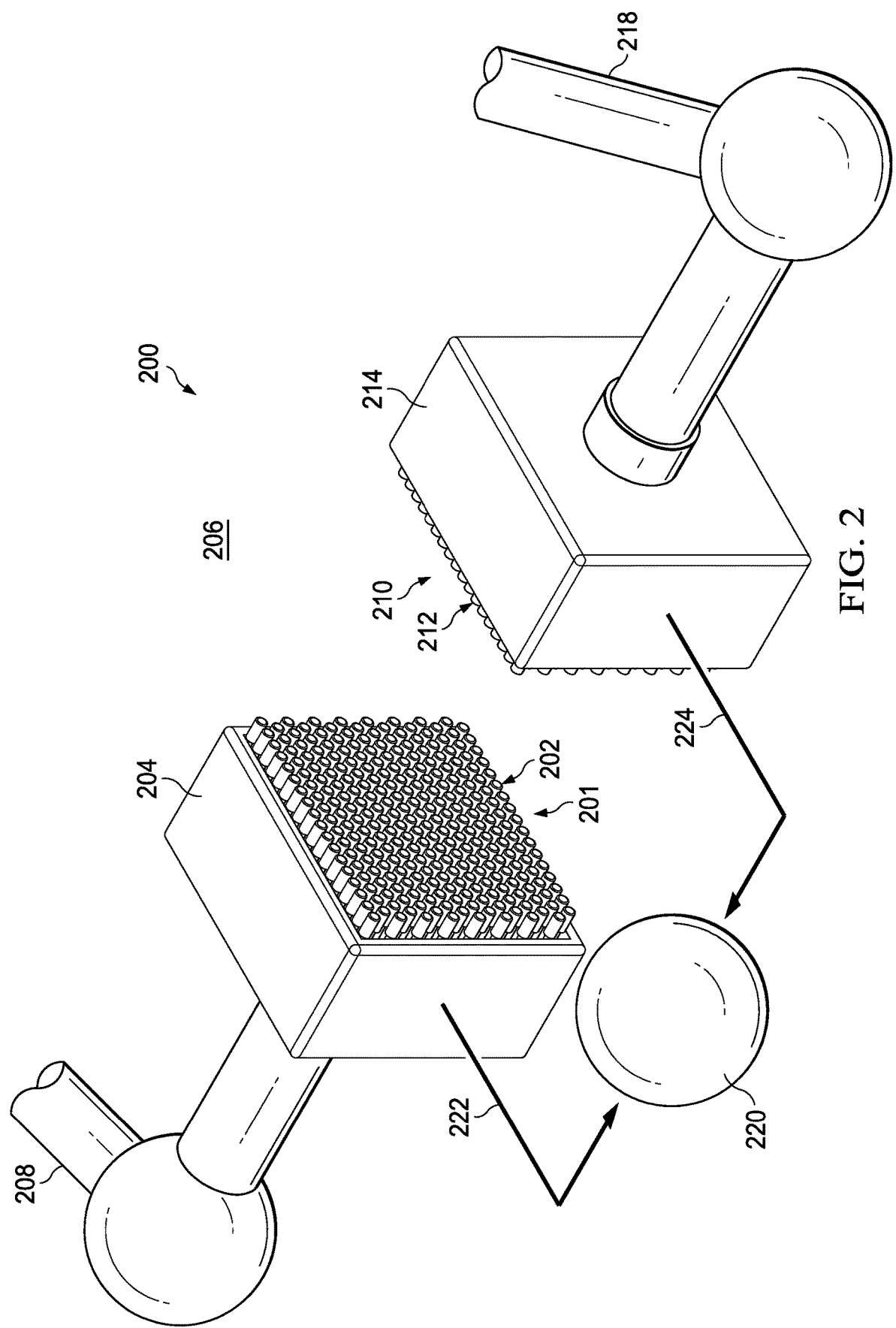
FIG. 2 is an illustration of a pin field end effector in accordance with an illustrative embodiment.

Turning to FIG. 2, an illustration of a pin field end effector is depicted in accordance with an illustrative embodiment. Pin field end effector 200 comprises pin field 201 and pin field 210. Pin field 201 and pin field 210 are examples of implementations of remote pin field 102 in FIG. 1.

Pin field 201 comprises a plurality of pins 202 mounted generally parallel with one another in frame 204. Frame 204 forms a housing for supporting pins 202. Each of pins 202 may be independently extended and retracted from frame 204 to sense an object or structure in working environment 206 or manipulate an object in working environment 206. Working environment 206 may be an example of working environment 110 in FIG. 1.

The size, number, and strength of pins 202 in pin field 201 may be selected based on the target application. For example, the strength of pins 202 may be determined by the size of pins 202 and the material of which pins 202 are made. The size, shape, and thickness of frame 204 may be selected based on the target application. Pin field 201 may be made more rugged for use in harsh environments. For example, without limitation, rubber skirts may be provided around each pin 202 where each pin 202 exits frame 204 housing.

Pin field 201 may be provided as an end effector attached to manipulator arm 208. For example, without limitation, manipulator arm 208 may be part of a fixed or mobile robot system configured for operation in working environment 206. For example, without limitation, manipulator arm 208 may be part of a robot platform, a crawler robot, or any other appropriate robotic system. Manipulator arm 208 may be operated in a known manner to position pin field 201 at a desired position in working environment 206.

Pin field 210 comprises plurality of pins 212 mounted parallel with each other in frame 214. Each of pins 212 may be independently extended and retracted from frame 214 to sense an object or structure in working environment 206 or manipulate an object in working environment 206. Pin field 210 may be the same as, or different from pin field 201. For example, in certain embodiments, pin field 201 may include pressure-sensing pins (not shown) while pin field 210 includes temperature-sensing pins (also not shown). As another example, a position of each pin relative to the frame may be determined to sense a shape of the object.

Pin field 210 may be provided as an end effector attached to manipulator arm 218. Manipulator arm 218 may be part of the same fixed or mobile robot system as manipulator arm 208 or may be part of a different fixed or mobile robot system. In any case, manipulator arm 218 may be operated in a known manner to position pin field 210 at a desired position in working environment 206.

Manipulator arms 208 and 218 may be operated simultaneously in a coordinated manner to position pin fields 201 and 210 to perform a desired operation in working environment 206. For example, without limitation, manipulator arm 208 may be operated to move pin field 201 in the directions indicated by arrow 222 to position pin field 201 on one side of object 220 in working environment 200. At the same time, manipulator arm 218 may be operated to move pin field 210 in the directions of arrow 224 to position pin field 210 on another side of an object 220. Object 220 thus may be grasped between pin field 201 and pin field 210 so that object 220 may be moved or otherwise manipulated.

More or fewer than two pin fields mounted on more or fewer than two manipulator arms may be provided to perform desired operations in any appropriate working environment in accordance with an illustrative embodiment.

Figure 3:
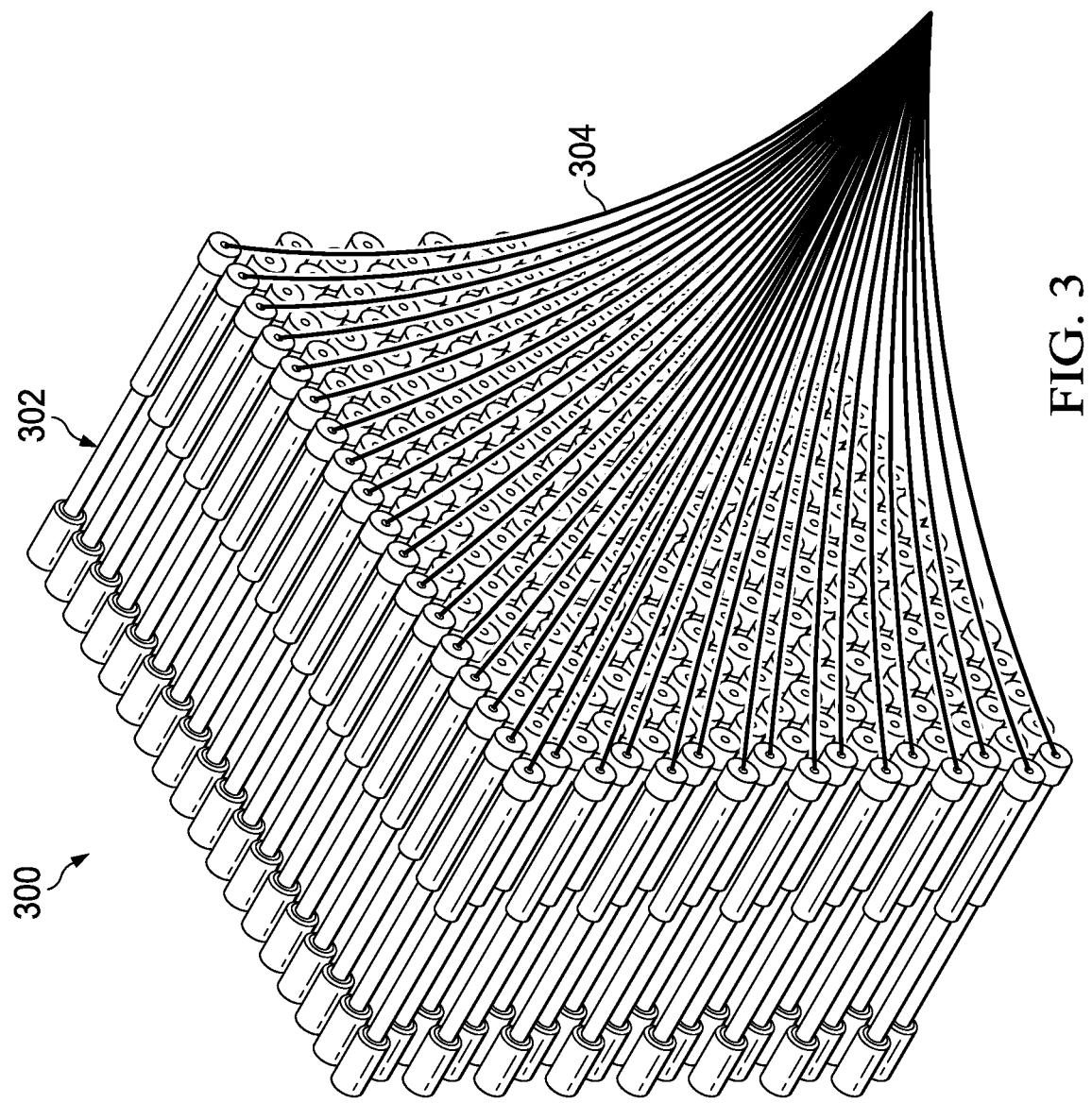
FIG. 3 is an illustration of a pin field in accordance with an illustrative embodiment.

Turning to FIG. 3, an illustration of a pin field is depicted in accordance with an illustrative embodiment. Pin field 300 is an example of one possible implementation of remote pin field 102 in FIG. 1. Pin field 300 is an example of one possible implementation of pin field 201 in FIG. 2 in which pins 202 are shown separated from frame 204.

Pin field 300 includes any appropriate number of pins 302. Pins 302 are oriented generally perpendicular with one another in pin field 300.

All of pins 302 in pin field 300 may be the same. Alternatively, pin field 300 may include different types of pins specifically configured for different purposes. For example, without limitation, pin field 300 may include pins specifically configured for grasping and manipulating objects interspersed with pins specifically configured for sensing. For example, pins 302 configured for sensing may include appropriate sensors mounted therein, whereas pins 302 configured for manipulation may not include sensors. As another example, pins 302 configured for manipulating an object may include a surface material that prevents slipping between pins 302 and the object when pins 302 are brought into contact with the object. In contrast, the surface of pins 302 configured for sensing may be configured to enhance, or at least not to detract from, sensing by the sensors therein.

Wires 304 may be connected to each of pins 302 in pin field 300 to provide power and control signals to pins 302 and to receive sensor signals from pins 302.

Figure 4:
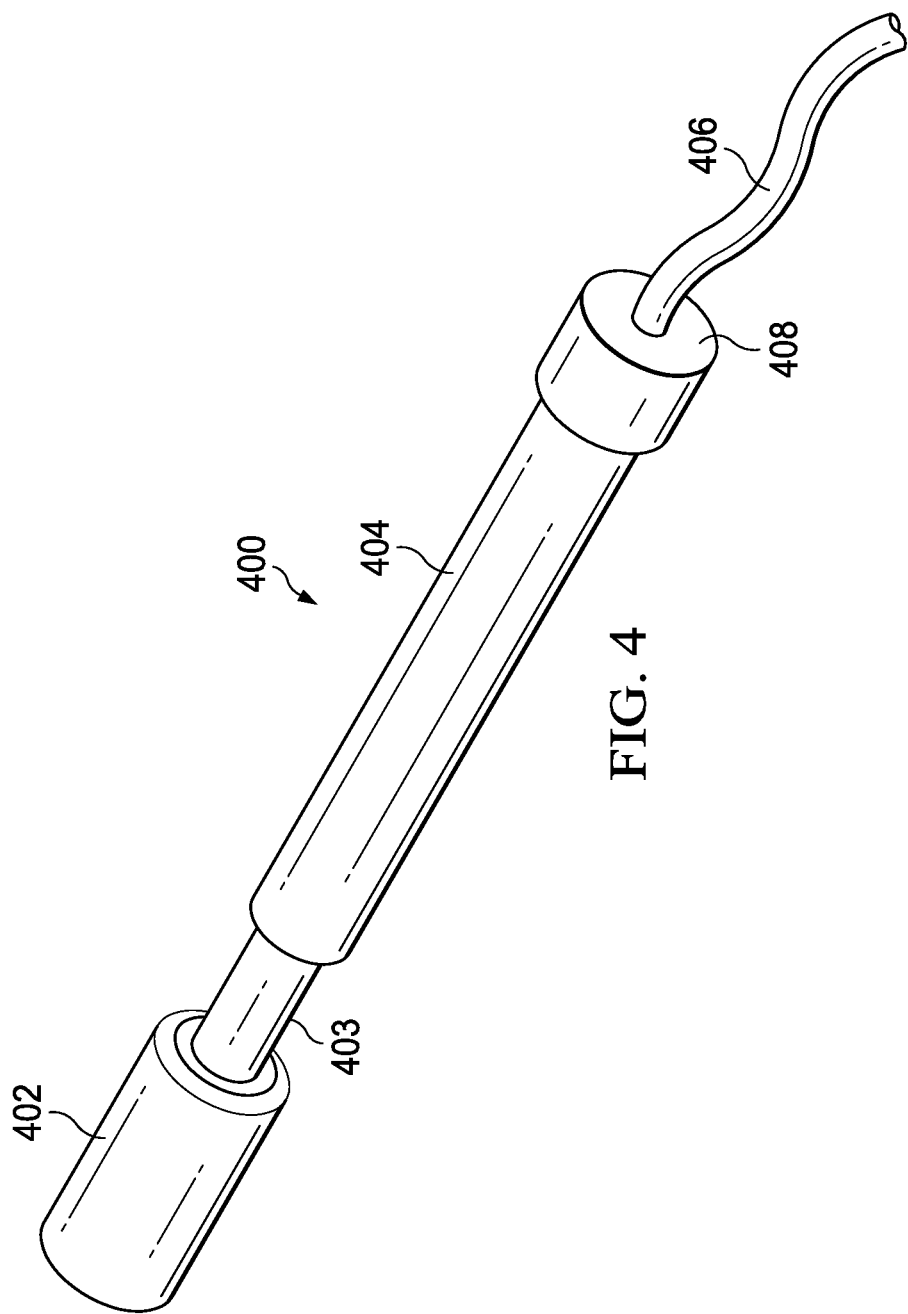
FIG. 4 is an illustration of a pin in a collapsed state in accordance with an illustrative embodiment.

Turning to FIG. 4, an illustration of a pin in a collapsed state is depicted in accordance with an illustrative embodiment. Pin 400 is an example of one possible implementation of a pin in plurality of pins 104 in remote pin field 102 in FIG. 2. In this example, pin 400 is a miniature linear telescoping actuator that may be used to implement pins in a pin field in accordance with an illustrative embodiment.

Distal end 402 of pin 400 may have one or more sensors mounted therein or thereon in any appropriate manner. For example, distal end 402 of pin 400 may include a pressure sensor, a temperature sensor, both a pressure sensor and a temperature sensor, or a combined temperature and pressure sensor. A combined pressure and temperature sensor at distal end 402 of pin 400 may include both a pressure sensor and a temperature sensor in one device. Distal end 402 of pin 400 also may be referred to as the head of pin 400.

Distal end 402 of pin 400 is attached by telescoping portion 403 to body 404 of pin 400. Telescoping portion 403 is configured to move inward and outward from body 404, thereby to move distal end 402 of pin 400 toward and away from body 404. Controlled linear movement of telescoping portion 403 may be implemented in any appropriate manner. For example, pin 400 may be an electro-mechanical linear actuator in which telescoping portion 403 of pin 400 is moved by converting rotary motion of an electric motor into linear displacement in any appropriate manner.

Body 404 of pin 400 may be configured to be mounted in a frame or other appropriate support structure. For example, without limitation, wire 406 may be connected to body 404 at proximal end 408 of pin 400 to provide power and control signals to pin 400 and to receive sensor signals from pin 400.

Figure 5:
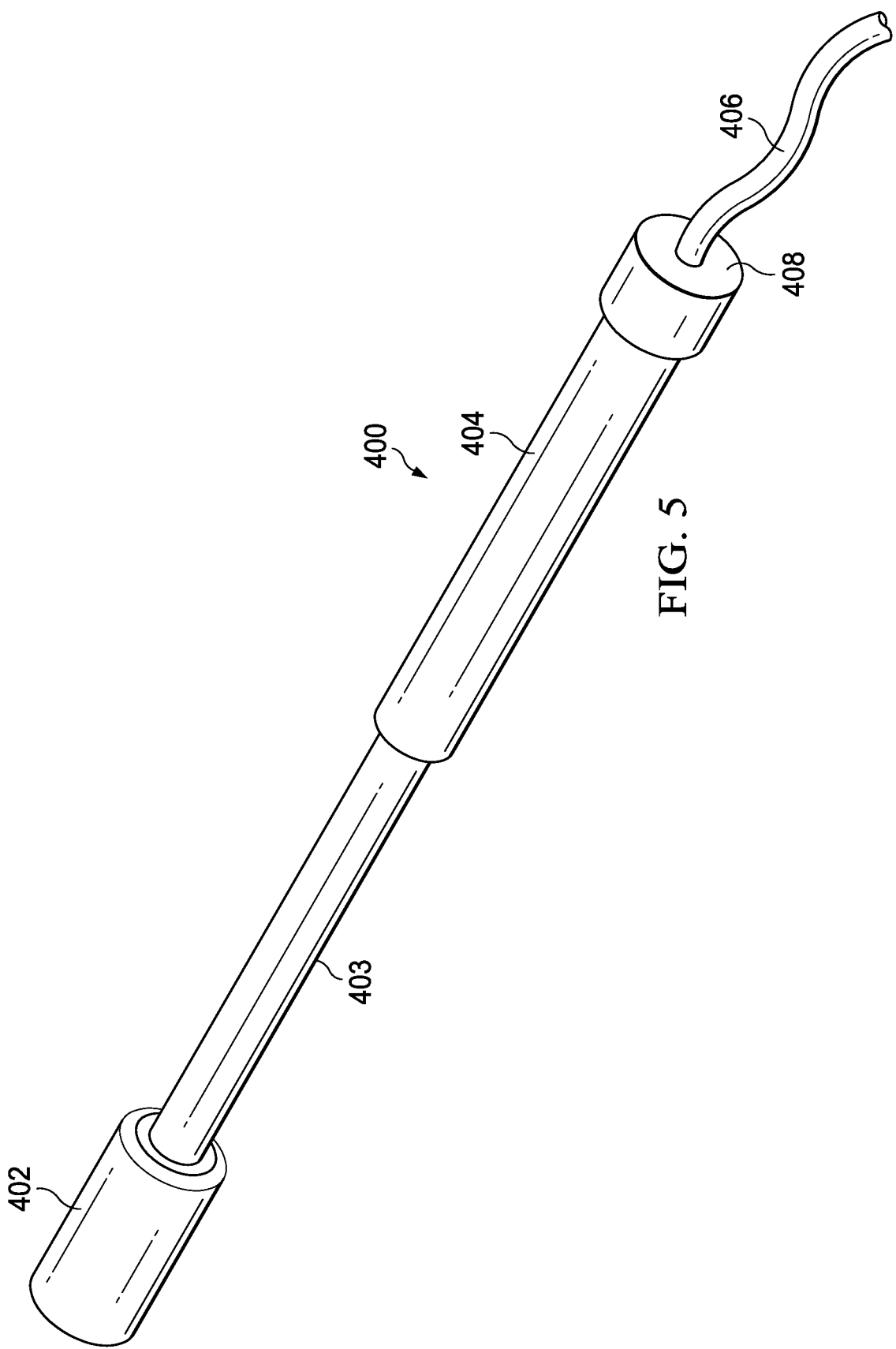
FIG. 5 is an illustration of a pin in an extended state in accordance with an illustrative embodiment.

Turning to FIG. 5, an illustration of a pin in an extended state is depicted in accordance with an illustrative embodiment. FIG. 5 shows pin 400 from FIG. 4 in an extended state. In an extended state, telescoping portion 403 of pin 400 is extended from body 404 of pin 400 by a greater amount than when pin 400 is in a collapsed state, as shown in FIG. 4. In accordance with an illustrative embodiment, pin 400 may be controlled such that telescoping portion 403 of pin 400 may be extended to any appropriate extended position between and including collapsed state shown in FIG. 4 and extended state shown in FIG. 5.

Providing pins in plurality of pins 104 in remote pin field 102 with a combination pressure and temperature sensor allows remote pin field 102 to relay data regarding changes in temperature and weight of object 108. For example, the weight of object 108 may be determined using remote pin field 102 by measuring the pressure or force exerted by object 108 on plurality of pins 104 in remote pin field 102 while object 108 is supported by plurality of pins 104.

Not only does this allow for the detection of changes in temperature and weight, but it may be used to provide valuable data on object 108 as it shows values and changes for each data point that corresponds to a pin in plurality of pins 104 in remote pin field 102. This allows data to be used for determinations in component differentiation on object 108. For example, without limitation, one application may be to determine a temperature of a wire to monitor an overload condition. Ambient temperature can be determined, then by comparing temperature either above or below the ambient temperature to the object, taking time-interval temperature readings at data point corresponding to a pin in remote pin field 102, material types of various components of object 108 can be determined based on their conductivity and the time it takes to return to an ambient temperature. Additionally or optionally, when more than one wire is present in object 108, a temperature difference between the wires can be calculated to sense when a wire is heating relative to the other.

Pressure or force data obtained from plurality of pins 104 as remote pin field 102 is moved into contact with object 108 may be analyzed to make material type determinations. Information obtained by measuring the change in pressure of force detected by plurality of pins 104 in remote pin field 102 as remote pin field 102 is moved into contact with object 108, or as object 108 is moved into contact with remote pin field 102, may be referred to as force feedback information. For example, in accordance with an illustrative embodiment, such force feedback information from remote pin field 102 may be used to determine whether a material of object 108 in contact with remote pin field 102 is a rubber coated wire, an uncoated copper wire, a static metal surface, or another material.

Determinations of the shape and material of object 108 made using remote pin field 102 may be used as input to a system that uses machine learning to identify object 108. A machine learning system may be trained using a repository of information for standard hardware components or other objects. For example, without limitation, a repository of CAD data for standard hardware components may be used to train the machine learning system. Determinations of the shape and material of known objects made using remote pin field 102 may be used to further train the machine learning system. The trained machine learning system then may be used to identify an unknown object based on the shape and material of the object as determined using remote pin field 102 in accordance with an illustrative embodiment.

For example, without limitation, based on a determined shape with six sides, the height of the component identified as 0.25 inches, and a material determination of stainless steel based on force and temperature feedback, a machine learning system in accordance with an illustrative embodiment can identify that an object is a stainless steel nut. Based on this identification, a system in accordance with an illustrative embodiment may be configured to know how to interact with the identified object based on standard and learned interactions, for example, to rotate the component counterclockwise to remove it from a structure.

Remote pin field 102 also may be used to manipulate components of object 108 in working environment 110 telerobotically with fine precision. Plurality of pins 104 in remote pin field 102 may be actuated to extend selected ones of plurality of pins 104 by an appropriate amount such that plurality of pins 104 is shaped to engage object 108 in a desired manner. For example, the desired shape presented by plurality of pins 104 may be achieved by controlling the actuation of plurality of pins 104 using a CAD model or other appropriate model of object 108. Alternatively, a user may use haptic pin field to control actuation of plurality of pins 104. Remote pin field 102 may then be moved to engage and manipulate object 108. This allows an operator to interface with and manipulate the object telerobotically. Tasks may be completed with this feature such as moving and separating wires, installing or removing hardware, such as a nut, or picking up an object while making contact with only certain features.

For example, plurality of pins 104 in remote pin field 102 may be actuated to extend selected ones of plurality of pins 104 such that plurality of pins 104 presents a shape that is complementary to the shape of a nut. Remote pin field 102 then may be moved to be engaged over a nut that needs to be removed, with the pins in plurality of pins 104 adjacent to the exterior of the nut selected to be locked in place in an extended state while the rest of the pins are retracted. Then remote pin field 102 can be rotated about its axis to remove the nut. Thus, remote pin field 102 may be controlled to be used as a universal socket wrench.

Figure 6:
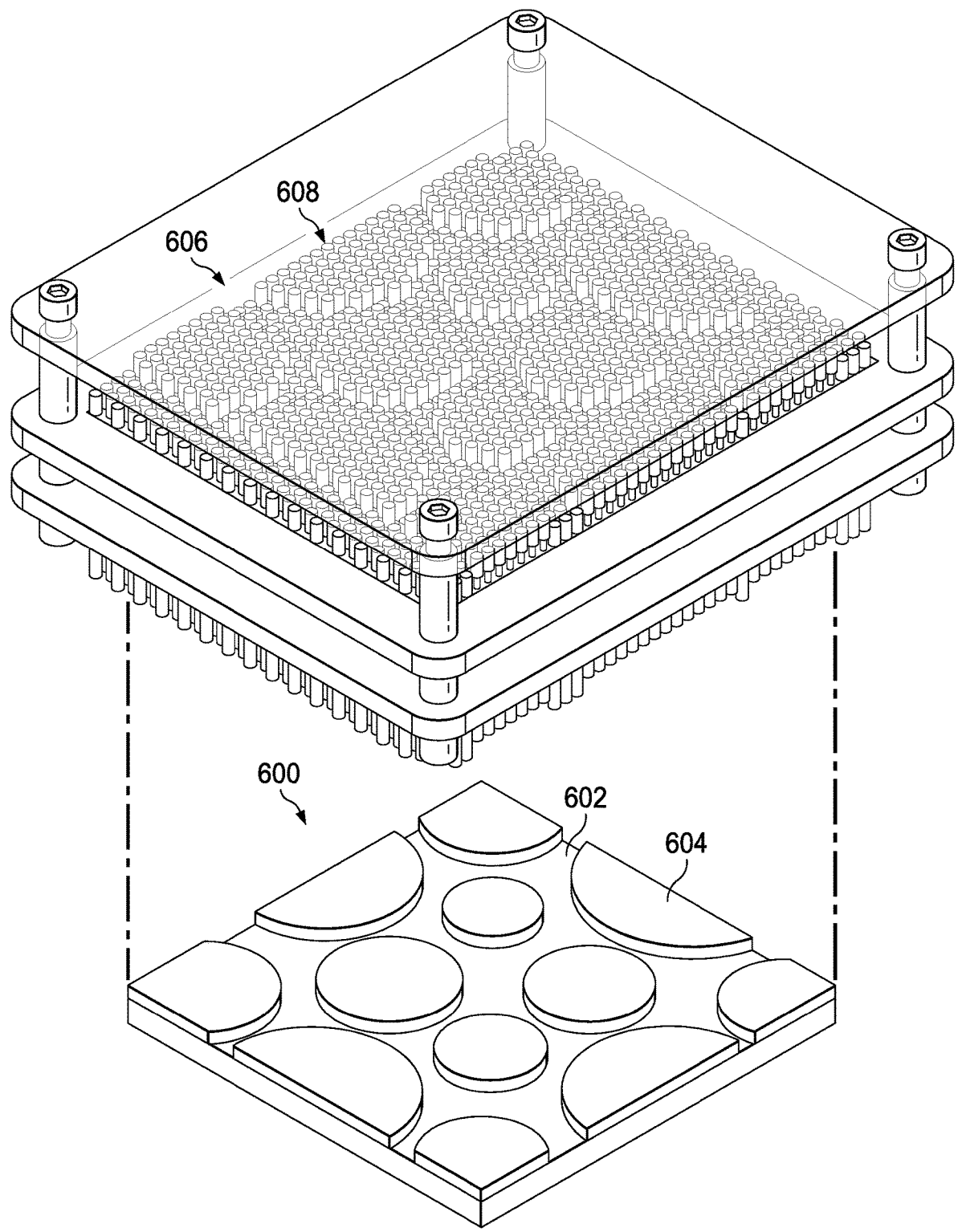
FIG. 6 is an illustration of an object in a working environment in accordance with an illustrative embodiment.

Turning to FIG. 6, an illustration of an object in a working environment is depicted in accordance with an illustrative embodiment. Object 600 may be an example of object 108 in working environment 110 in FIG. 1. In this example, object 600 comprises a flat surface 602 with generally circular shapes 604 extending outward therefrom.

In accordance with an illustrative embodiment, pin field 606 may be applied to the surface of object 600 to replicate its geometry through the movement of actuated pins 608 of pin field 606. Pin field 606 is an example of one possible implementation of remote pin field 102 in FIG. 1. The amount of extension of each of actuated pins 608 may be relayed back to a controller, such as controller 118 in FIG. 1.

Figure 7:
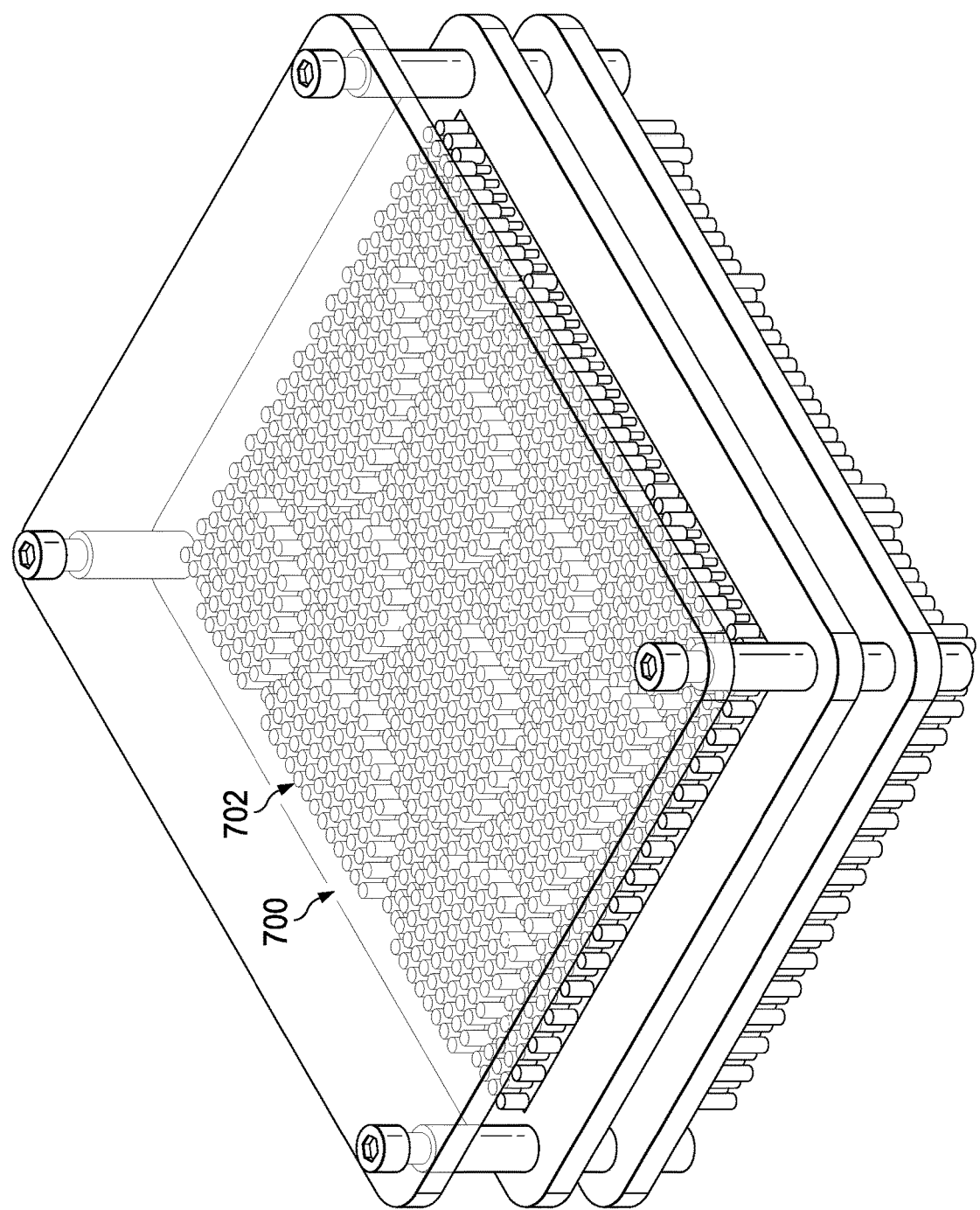
FIG. 7 is an illustration of an actuated haptic pin field in accordance with an illustrative embodiment.

Turning to FIG. 7, an illustration of an actuated haptic pin field is depicted in accordance with an illustrative embodiment. Haptic pin field 700 is an example of one possible implementation of haptic pin field 126 in FIG. 1. Haptic pin field 700 may be provided at an operator control station.

Haptic pin field 700 comprises a plurality of parallel actuator-driven pins 702. In accordance with an illustrative embodiment, pins 702 in haptic pin field 700 are controlled to replicate the surface of sensed object 600 based on the extension information provided from pins 608 in pin field 606 placed against object 600 in the working environment. Thus, an operator can effectively feel the surface of object 600 by feeling the accurate replication of the geometry of object 600 provided on haptic pin field 700. Thus, an operator at the control station can use their hands and sense of touch to interact and sense a replicated version of object 600 in a working environment.

Figure 8:
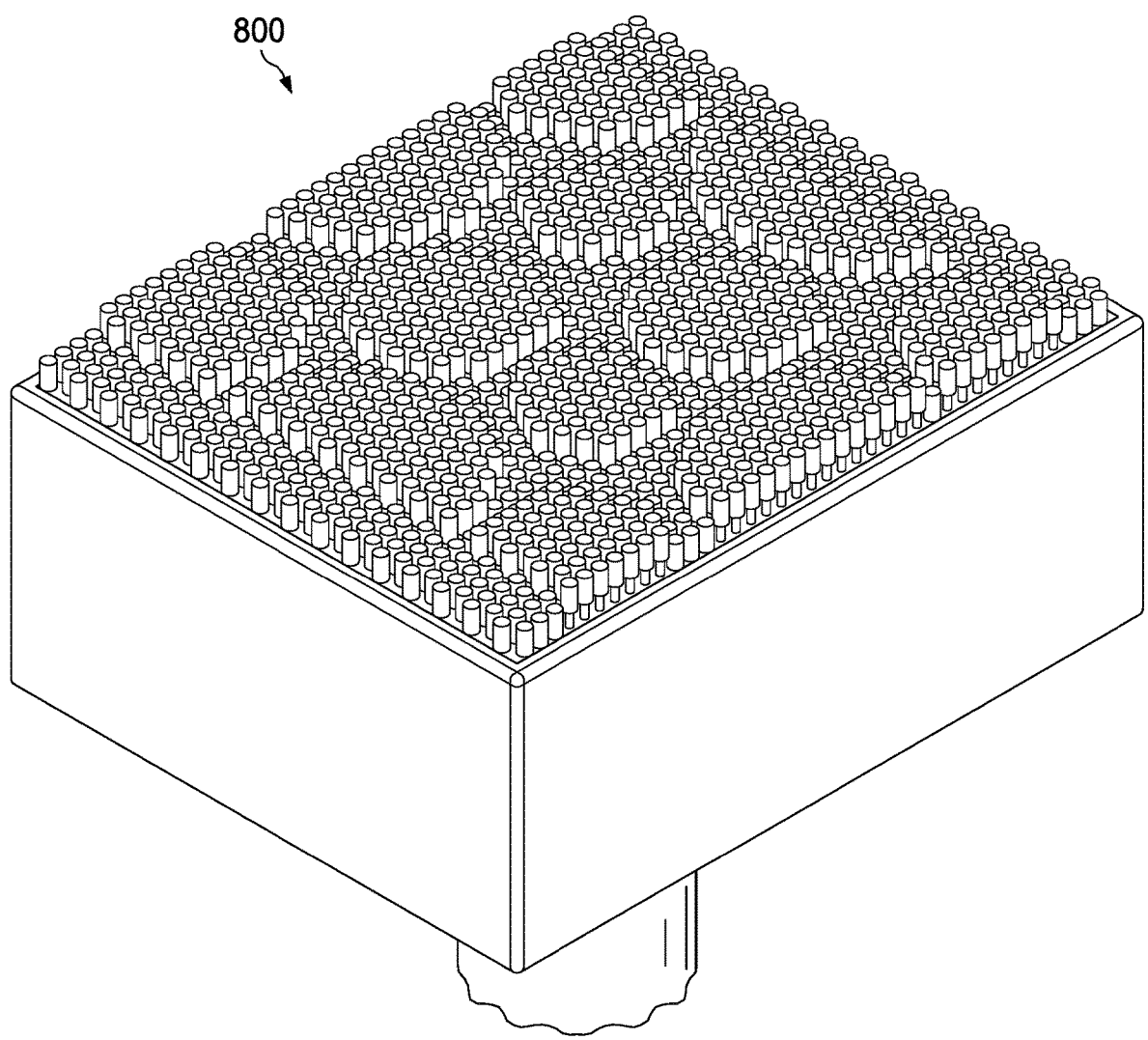
FIG. 8 is an illustration of a three-dimensional CAD model generated in accordance with an illustrative embodiment.

Turning to FIG. 8, an illustration of a three-dimensional CAD model is depicted in accordance with an illustrative embodiment. CAD model 800 is an example of one possible implementation of CAD model 122 in FIG. 1. Three-dimensional CAD model 800 may be generated from pins in a pin field placed against an object in the working environment. Different surface heights of the object represented in CAD model 800 may be color-coded or otherwise indicated in any appropriate manner.

Figure 9:
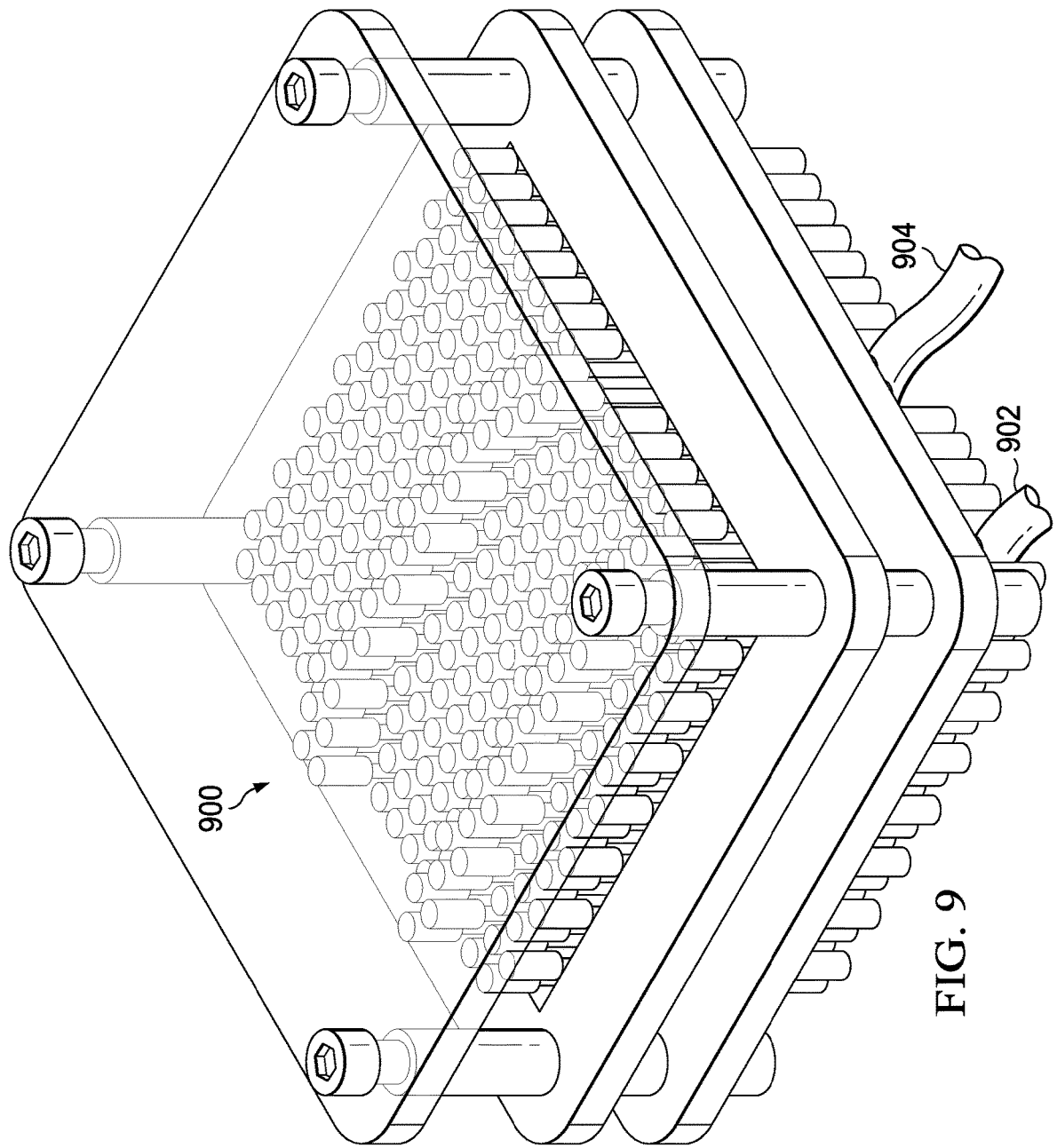
FIG. 9 is an illustration of a pin field sensing two wires in accordance with an illustrative embodiment.

Turning to FIG. 9, an illustration of a pin field sensing two wires is depicted in accordance with an illustrative embodiment. Pin field 900 is an example of one possible implementation of remote pin field 102 in FIG. 1. In this example, pin field 900 is positioned to sense wires 902 and 904.

Figure 10:
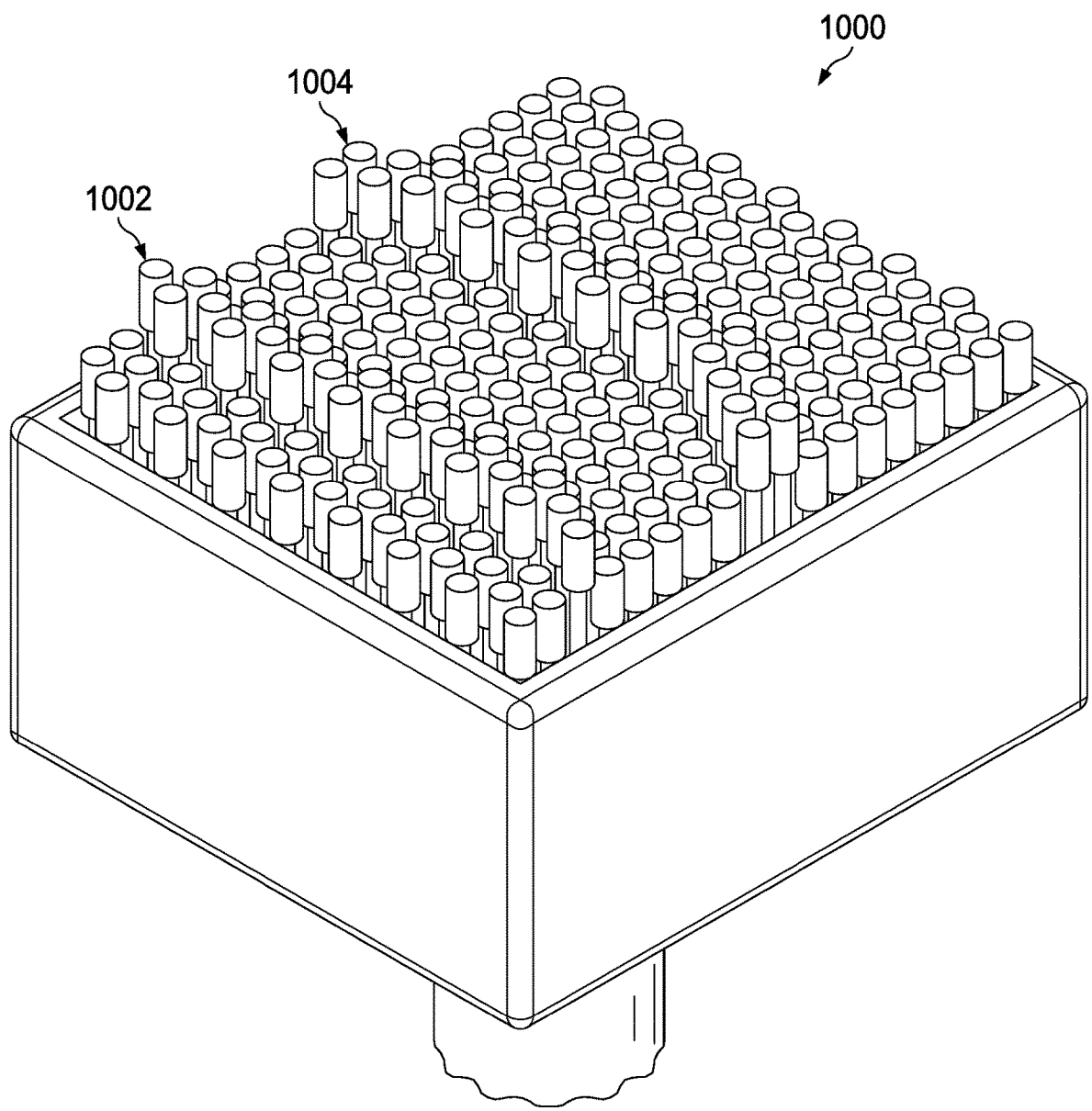
FIG. 10 is an illustration of a three-dimensional CAD model of the wires in FIG. 9 generated in accordance with an illustrative embodiment.

Turning to FIG. 10, an illustration of a three-dimensional CAD model of the wires in FIG. 9 is depicted in accordance with an illustrative embodiment. CAD model 800 is an example of one possible implementation of CAD model 122 in FIG. 1. CAD model 1000 may be generated from the information provided by pin field 900 positioned to sense wires 902 and 904 in FIG. 9.

In this example, shapes 1002 and 1004 of real-world wires 902 and 904 are captured in CAD model 1000. Furthermore, a change in temperature information or pressure information or a combination thereof as provided by pin field 900 may be used to distinguish different characteristics of wires 902 and 904. This may be indicated by color coding of shapes 1002 and 1004 of wires 902 and 904 in CAD model 1000, or in any other appropriate manner.

Figure 11:
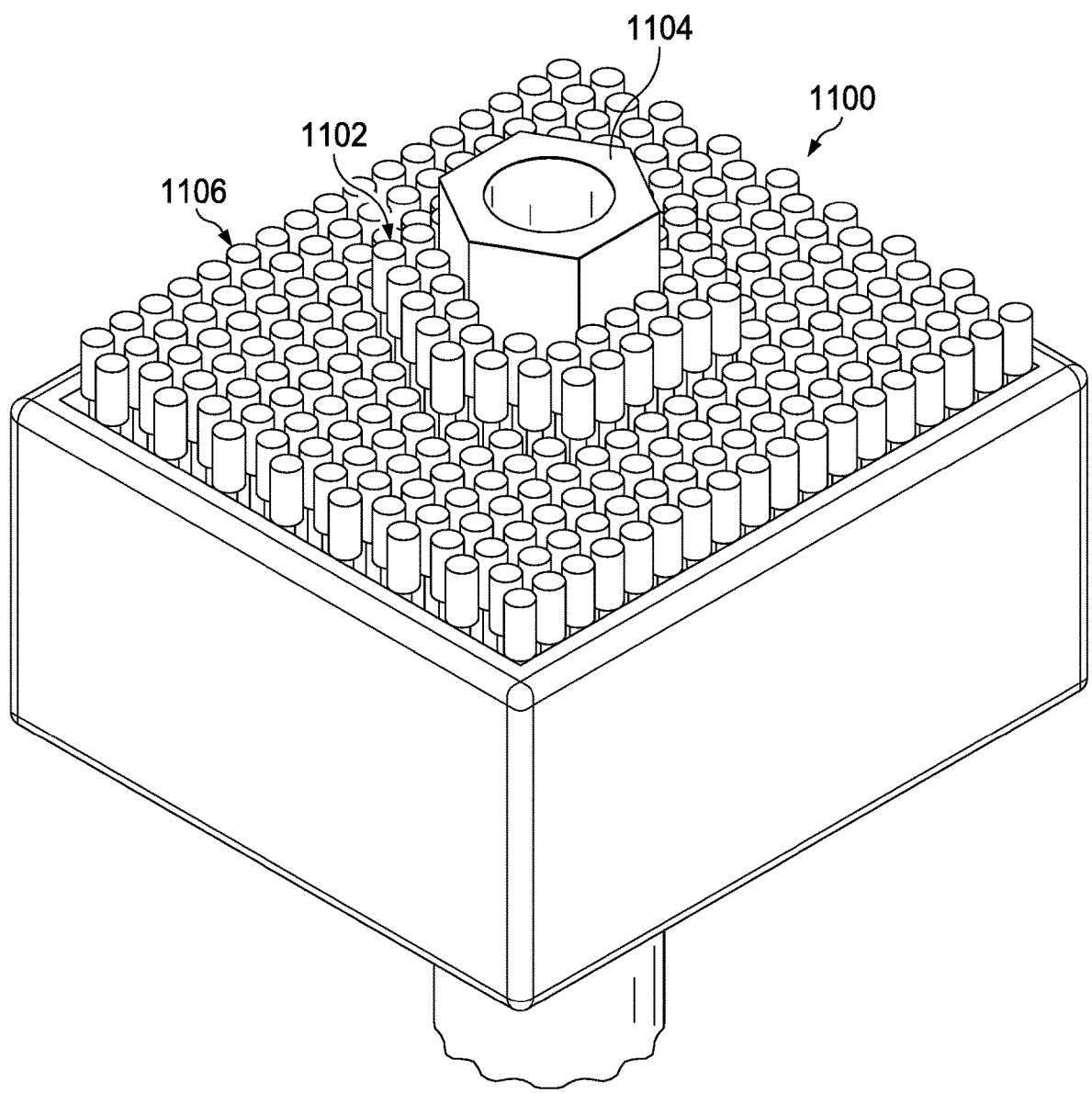
FIG. 11 is an illustration of a pin field configured to turn a nut in accordance with an illustrative embodiment.

Turning to FIG. 11, an illustration of a pin field configured to turn a nut is depicted in accordance with an illustrative embodiment. Pin field 1100 may be an example of an implementation of remote pin field 102 in FIG. 1.

Pins in pin field 1100 may be manipulated from a computer CAD model or from a haptic pin field to move the pins in pin field 1100. This allows an operator to interface with and manipulate an object telerobotically.

In this example, pin field 1100 has been engaged over nut 1104. Pins 1102 adjacent to nut 1104 are selected to be extended and locked in place in the extended state. The rest of pins 1106 are retracted. The pin field may then be rotated to turn the nut 1104.

Figure 12:
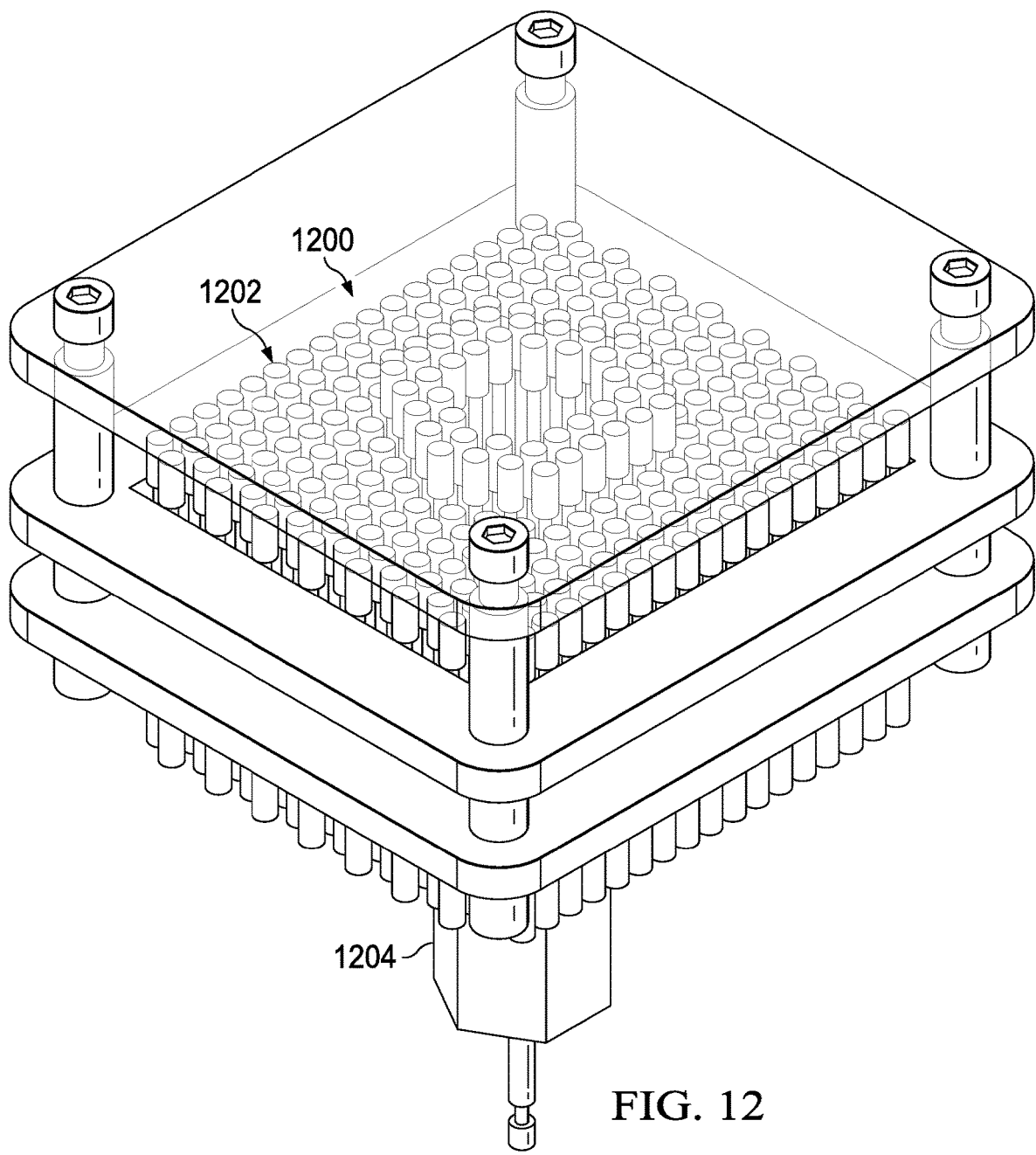
FIG. 12 is an illustration of a pin field configured to grasp an object in accordance with an illustrative embodiment.

Turning to FIG. 12, an illustration of a pin field configured to grasp an object is depicted in accordance with an illustrative embodiment. Pin field 1200 is an example of remote pin field 102 in FIG. 1.

Rather than seeking to find the perfect size or shape end effector design for grasping, illustrative embodiments allow pin field 1200 to make contact with the geometry of object 1204 to be grasped, engaging all its protrusions and intrusions for a firm, universal hold when the actuators are locked in place upon engagement. In this case, pins 1202 provide the perfect interference-style grasp for any object or geometry that might be encountered.

Figure 13:
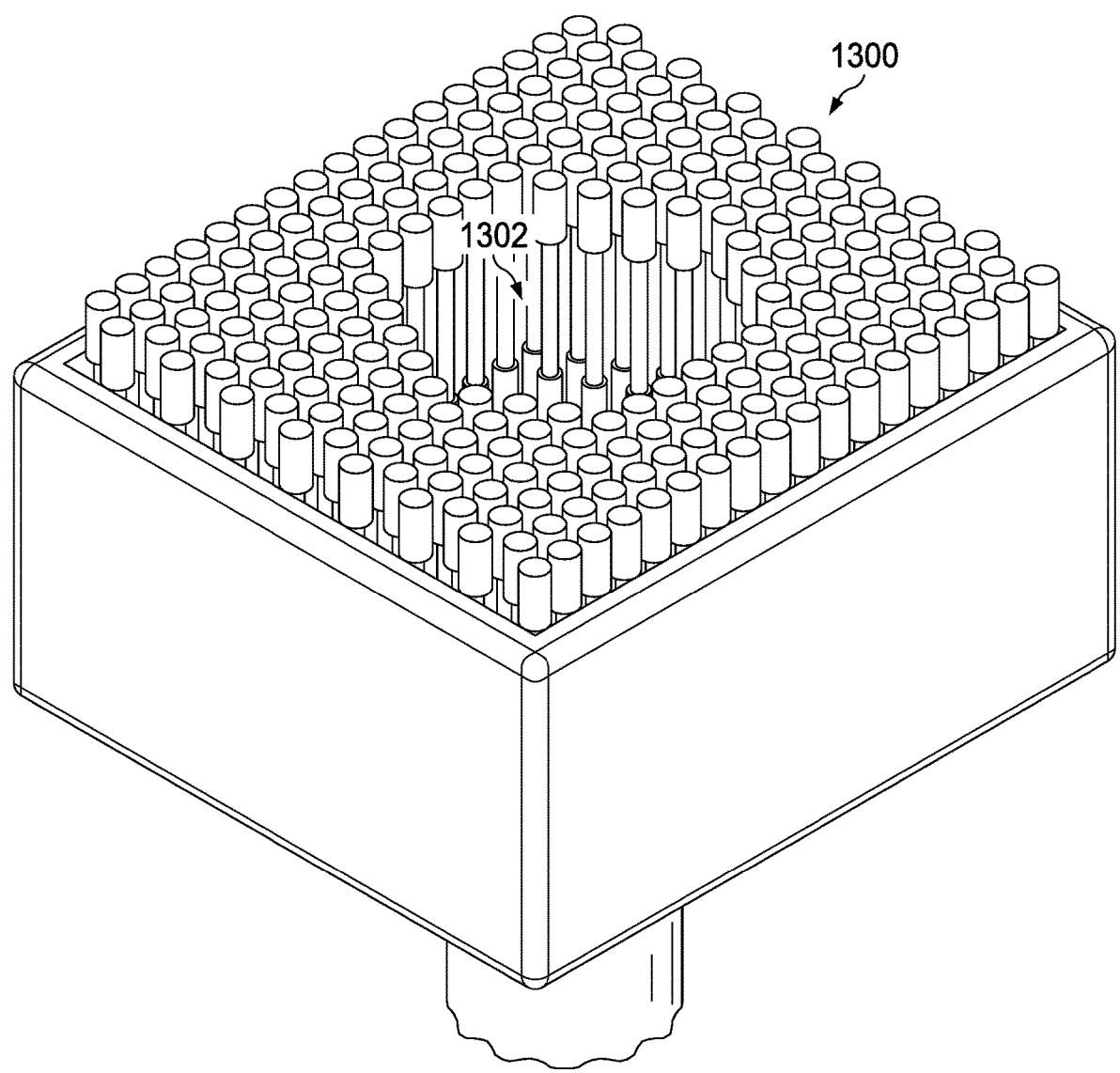
FIG. 13 is an illustration of a pin field with a tool access hole in accordance with an illustrative embodiment.

FIG. 13 is an illustration of a pin field with a tool access hole in accordance with an illustrative embodiment. Pin field 1300 is an example of remote pin field 102 in FIG. 1.

The design of a pin field in accordance with an illustrative embodiment may be modified for specific needs. For example, without limitation, tool access hole 1302 may be placed in pin field 1300 to allow an appropriate tool to access parts being held by pin field 1300. Tools such as screw drivers, scissors, wire cutters, chemical applicators, and any other appropriate tools may gain access to a part through tool access hole 1302.

Figure 14:
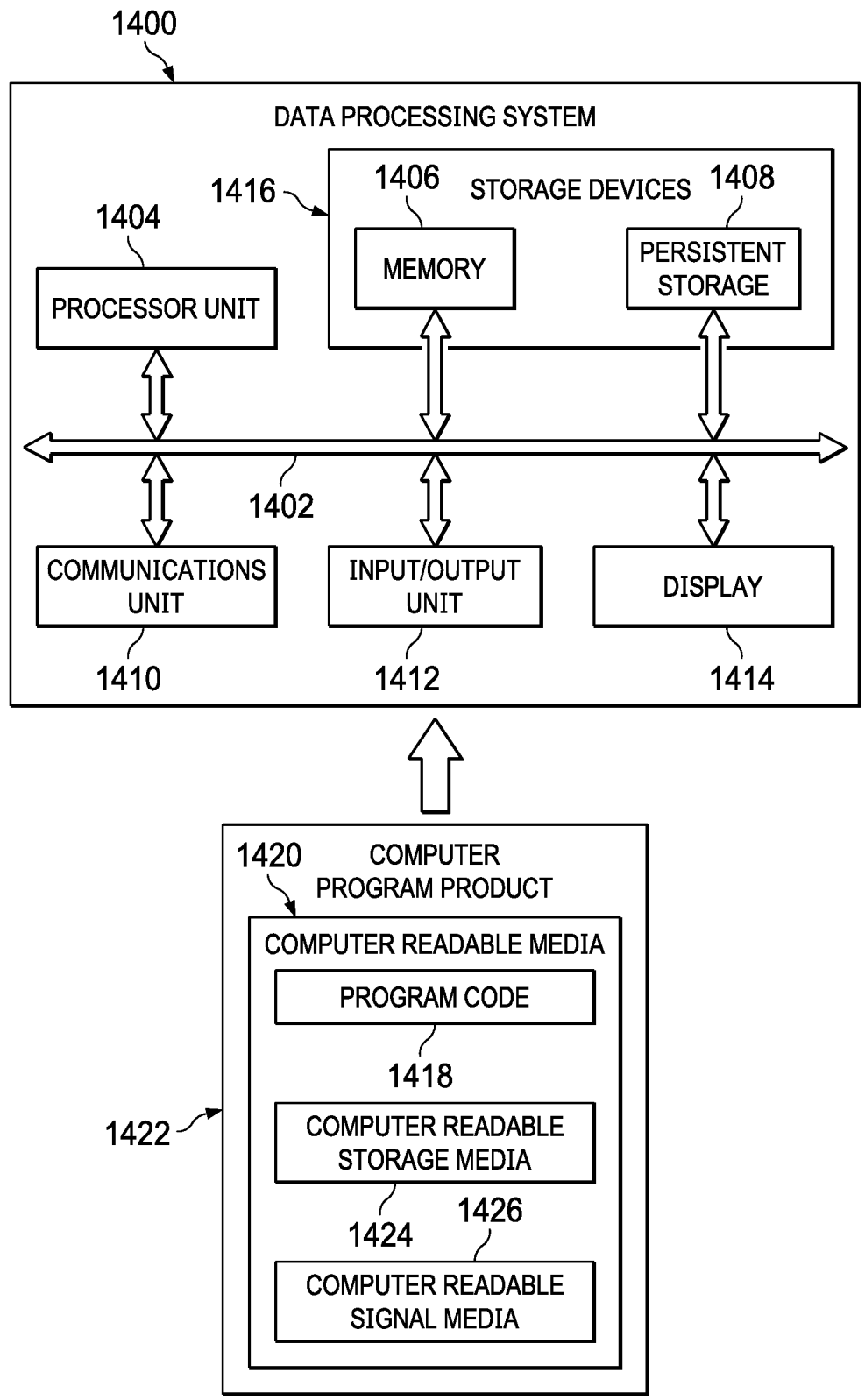
FIG. 14 is an illustration of a block diagram of a data processing system in accordance with an illustrative embodiment.

Turning to FIG. 14, an illustration of a block diagram of a data processing system is depicted in accordance with an illustrative embodiment. Data processing system 1400 is an example of one possible implementation of a data processing system for implementing controller 118 in FIG. 1.

In this illustrative example, data processing system 1400 includes communications fabric 1402. Communications fabric 1402 provides communications between processor unit 1404, memory 1406, persistent storage 1408, communications unit 1410, input/output (I/O) unit 1412, and display 1414. Memory 1406, persistent storage 1408, communications unit 1410, input/output (I/O) unit 1412, and display 1414 are examples of resources accessible by processor unit 1404 via communications fabric 1402.

Processor unit 1404 serves to run instructions for software that may be loaded into memory 1406. Processor unit 1304 may be a number of processors, a multi-processor core, or some other type of processor, depending on the particular implementation. Further, processor unit 1404 may be implemented using a number of heterogeneous processor systems in which a main processor is present with secondary processors on a single chip. As another illustrative example, processor unit 1404 may be a symmetric multi-processor system containing multiple processors of the same type.

Memory 1406 and persistent storage 1408 are examples of storage devices 1416. A storage device is any piece of hardware that is capable of storing information, such as, for example, without limitation, data, program code in functional form, and other suitable information either on a temporary basis or a permanent basis. Storage devices 1416 also may be referred to as computer readable storage devices in these examples. Memory 1406, in these examples, may be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these examples, provides for communications with other data processing systems or devices. In these examples, communications unit 1410 is a network interface card. Communications unit 1410 may provide communications through the use of either or both physical and wireless communications links.

Input/output (I/O) unit 1412 allows for input and output of data with other devices that may be connected to data processing system 1400. For example, input/output (I/O) unit 1412 may provide a connection for user input through a keyboard, a mouse, and/or some other suitable input device. Further, input/output (I/O) unit 1412 may send output to a printer. Display 1414 provides a mechanism to display information to a user.

Instructions for the operating system, applications, and/or programs may be located in storage devices 1416, which are in communication with processor unit 1404 through communications fabric 1402. In these illustrative examples, the instructions are in a functional form on persistent storage 1408. These instructions may be loaded into memory 1406 for execution by processor unit 1404. The processes of the different embodiments may be performed by processor unit 1404 using computer-implemented instructions, which may be located in a memory, such as memory 1406.

These instructions are referred to as program instructions, program code, computer usable program code, or computer readable program code that may be read and executed by a processor in processor unit 1404. The program code in the different embodiments may be embodied on different physical or computer readable storage media, such as memory 1306 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these examples. In one example, computer readable media 1420 may be computer readable storage media 1424 or computer readable signal media 1426.

Computer readable storage media 1424 may include, for example, an optical or magnetic disk that is inserted or placed into a drive or other device that is part of persistent storage 1408 for transfer onto a storage device, such as a hard drive, that is part of persistent storage 1408. Computer readable storage media 1424 also may take the form of a persistent storage, such as a hard drive, a thumb drive, or a flash memory, that is connected to data processing system 1400. In some instances, computer readable storage media 1424 may not be removable from data processing system 1400.

In these examples, computer readable storage media 1424 is a physical or tangible storage device used to store program code 1418 rather than a medium that propagates or transmits program code 1418. Computer readable storage media 1424 is also referred to as a computer readable tangible storage device or a computer readable physical storage device. In other words, computer readable storage media 1424 is a media that can be touched by a person.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1418 may be downloaded over a network to persistent storage 1408 from another device or data processing system through computer readable signal media 1426 for use within data processing system 1400. For instance, program code stored in a computer readable storage medium in a server data processing system may be downloaded over a network from the server to data processing system 1400. The data processing system providing program code 1418 may be a server computer, a client computer, or some other device capable of storing and transmitting program code 1418.

The different components illustrated for data processing system 1400 are not meant to provide architectural limitations to the manner in which different embodiments may be implemented. The different illustrative embodiments may be implemented in a data processing system including components in addition to and/or in place of those illustrated for data processing system 1400. Other components shown in FIG. 14 can be varied from the illustrative examples shown. The different embodiments may be implemented using any hardware device or system capable of running program code. As one example, data processing system 1400 may include organic components integrated with inorganic components and/or may be comprised entirely of organic components excluding a human being. For example, a storage device may be comprised of an organic semiconductor.

In another illustrative example, processor unit 1404 may take the form of a hardware unit that has circuits that are manufactured or configured for a particular use. This type of hardware may perform operations without needing program code to be loaded into a memory from a storage device to be configured to perform the operations.

For example, when processor unit 1404 takes the form of a hardware unit, processor unit 1404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1418 may be omitted, because the processes for the different embodiments are implemented in a hardware unit.

In still another illustrative example, processor unit 1404 may be implemented using a combination of processors found in computers and hardware units. Processor unit 1404 may have a number of hardware units and a number of processors that are configured to run program code 1418. With this depicted example, some of the processes may be implemented in the number of hardware units, while other processes may be implemented in the number of processors.

In another example, a bus system may be used to implement communications fabric 1402 and may be comprised of one or more buses, such as a system bus or an input/output bus. Of course, the bus system may be implemented using any suitable type of architecture that provides for a transfer of data between different components or devices attached to the bus system.

Additionally, communications unit 1410 may include a number of devices that transmit data, receive data, or both transmit and receive data. Communications unit 1410 may be, for example, a modem or a network adapter, two network adapters, or some combination thereof. Further, a memory may be, for example, memory 1406, or a cache, such as that found in an interface and memory controller hub that may be present in communications fabric 1402.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A pin field, comprising:
    a plurality of pins mounted parallel with each other in a frame; and
    wherein each pin in the plurality of pins is independently extendable and retractable from the frame for sensing of an object or manipulation of the object in a working environment; and
    wherein a distal end of each pin in the plurality of pins comprises a combination pressure and temperature sensor;
    wherein the plurality of pins is configured to provide pressure information and temperature information for the object against which the plurality of pins is placed, and further comprising:
        a data processing system configured to identify a material of which the object is made using the pressure information and the temperature information provided by the plurality of pins.

2. The pin field of claim 1, wherein the working environment is inaccessible to a human including a confined space on an aircraft or a factory.

3. The pin field of claim 1 further comprising a manipulator arm, wherein the pin field is an end effector attached to the manipulator arm.

4. The pin field of claim 3, wherein the pin field is a first pin field and the manipulator arm is a first manipulator arm, and further comprising:
    a second pin field comprising a second plurality of pins mounted parallel with each other in a second frame, wherein the second plurality of pins are independently extendable and retractable from the second frame;
    a second manipulator arm, wherein the second pin field is an end effector attached to the second manipulator arm; and
    wherein the first manipulator arm and the second manipulator arm are configured to be operated simultaneously to position the first pin field and the second pin field to perform an operation in the working environment.

5. The pin field of claim 4, wherein the first manipulator arm and the second manipulator arm are configured to position the first pin field and the second pin field on different sides of the object to be manipulated by the first pin field operating simultaneously with the second pin field.

6. The pin field of claim 1, wherein the plurality of pins comprises pins configured for the manipulation of the object interspersed with pins configured for the sensing of the object.

7. The pin field of claim 1 further comprising wires connected to the plurality of pins to provide control signals to the plurality of pins and to receive sensor information from the plurality of pins.

8. The pin field of claim 1, wherein each pin in the plurality of pins comprises a linear telescoping actuator.

9. The pin field of claim 1, wherein:
    the plurality of pins are placed against an object including a first wire and a second wire;
    a combination of pressure and temperature information is received from each of the plurality of pins in the pin field placed against the first wire and second wire; and pressure and temperature information is compared from each of the plurality of pins placed against the first wire and second wire to determine a condition of one of the first wire and the second wire.

10. A pin field sensing system, comprising:
a remote pin field comprising a first plurality of pins mounted parallel with each other in a frame, wherein each pin in the first plurality of pins is extendable and retractable from the frame to sense a shape of an object and wherein a distal end of each pin in the plurality of pins comprises a combination pressure and temperature sensor; and
a haptic pin field comprising a second plurality of pins mounted parallel with each other, wherein each pin in the second plurality of pins is an actuator driven pin, and wherein each pin in the second plurality of pins in the haptic pin field is controlled to replicate the shape of the object against which the first plurality of pins is placed;
wherein:
the first plurality of pins are placed against an object;
pressure information and temperature information is received from the combination pressure and temperature sensor located at a distal end of each pin in the first plurality of pins; and
a material of which the object is made is identified using the pressure information and the temperature information provided by the first plurality of pins.

11. The pin field sensing system of claim 10, wherein:
the first plurality of pins are placed against an object including a first wire and a second wire;
a combination of pressure and temperature information is received from each of the first plurality of pins in the pin field placed against the first wire and second wire; and
pressure and temperature information is compared from each of the first plurality of pins placed against the first wire and second wire to determine a condition of one of the first wire and the second wire.

12. The pin field sensing system of claim 10, wherein the plurality of pins comprises pins configured for manipulation of the object interspersed with pins configured for the sensing of the object.

13. The pin field sensing system of claim 10 further comprising wires connected to the plurality of pins to provide control signals to the plurality of pins and to receive sensor information from the plurality of pins.

14. The pin field sensing system of claim 10, wherein each pin in the plurality of pins comprises a linear telescoping actuator.

15. A method of sensing or manipulating an object in a working environment, comprising:
placing a plurality of pins in a pin field against the object, wherein the pin field comprises a plurality of pins mounted parallel with each other in a frame, wherein each of the plurality of pins is independently extendable and retractable from the frame, wherein a distal end of each pin in the plurality of pins comprises a combination pressure and temperature sensor; and
receiving sensor information from the plurality of pins placed against the object for sensing the object or controlling the plurality of pins placed against the object for manipulation of the object in the working environment;
wherein receiving sensor information from the plurality of pins comprises receiving pressure information and temperature information from the combination pressure and temperature sensor located at a distal end of each pin in the plurality of pins for the object against which the plurality of pins are placed, and further comprising:
identifying a material of which the object is made using pressure information and temperature information provided by the plurality of pins.

16. The method of claim 15, wherein the working environment is inaccessible to a human including a confined space on an aircraft or a factory.

17. The method of claim 15, wherein:
the pin field is an end effector attached to a manipulator arm; and
placing the pin field against the object comprises operating the manipulator arm to position the pin field against the object.

18. The method of claim 15, wherein the plurality of pins comprises pins configured for manipulation of the object interspersed with pins configured for sensing of the object.

19. The method of claim 15 further comprising wires connected to the plurality of pins to provide control signals to the plurality of pins and to receive sensor information from the plurality of pins.

20. The method of claim 15, wherein each pin in the plurality of pins comprises a linear telescoping actuator.

21. The method of claim 15, wherein:
the plurality of pins in the pin field are placed against an object including a first wire and a second wire;
receiving the sensor information comprises receiving a combination of pressure and temperature information from each of the plurality of pins in the pin field placed against the first wire and second wire; and
comparing pressure and temperature information from each of the plurality of pins placed against the first wire and second wire to determine a condition of one of the first wire and the second wire.

22. The method of claim 15 further comprising controlling a plurality of pins in a haptic pin field to replicate a shape of the object against which the plurality of pins is placed.

* * * * *